(12) United States Patent
Davies et al.

(10) Patent No.: US 11,922,647 B2
(45) Date of Patent: Mar. 5, 2024

(54) IMAGE RENDERING METHOD AND APPARATUS

(71) Applicant: CANON MEDICAL SYSTEMS CORPORATION, Otawara (JP)

(72) Inventors: Ross Davies, Edinburgh (GB); Steven Reynolds, Edinburgh (GB)

(73) Assignee: CANON MEDICAL SYSTEMS CORPORATION, Otawara-shi (JP)

( * ) Notice: Subject to any disclaimer, the term of this patent is extended or adjusted under 35 U.S.C. 154(b) by 212 days.

(21) Appl. No.: 17/447,089

(22) Filed: Sep. 8, 2021

(65) Prior Publication Data

US 2023/0073574 A1    Mar. 9, 2023

(51) Int. Cl.
*G06T 7/50* (2017.01)
*G06T 7/00* (2017.01)
*G06T 7/33* (2017.01)

(52) U.S. Cl.
CPC ............ *G06T 7/337* (2017.01); *G06T 7/0014* (2013.01); *G06T 7/50* (2017.01); *G06T 2207/30201* (2013.01)

(58) Field of Classification Search
CPC .......... G06T 7/50; G06T 7/337; G06T 7/0014
See application file for complete search history.

(56) References Cited

U.S. PATENT DOCUMENTS

2009/0116765 A1    5/2009 Bystrov et al.
2010/0329529 A1*  12/2010 Feldman ........... G06F 18/21375
                                                    382/131
2012/0070053 A1*   3/2012 Liu .................... G06F 18/00
                                                    382/131
2016/0239632 A1    8/2016 Yu et al.
2016/0249885 A1*   9/2016 Schneider ............... G06T 7/149
                                                    382/131
2019/0080498 A1*   3/2019 Horie ....................... G06T 11/60
2020/0249032 A1*   8/2020 Lee ..................... G01C 21/3811

FOREIGN PATENT DOCUMENTS

EP           3 438 918 A1     2/2019

OTHER PUBLICATIONS

Dabbah et al., "Detection and location of 127 anatomical landmarks in divers CT datasets" Proceedings of SPIE 9034, Medical Imaging: Image Processing, 903415, Mar. 21, 2014, 12 pages, doi:10.1117/12.2039157.

* cited by examiner

*Primary Examiner* — Sam Bhattacharya
(74) *Attorney, Agent, or Firm* — Oblon, McClelland, Maier & Neustadt, L.L.P.

(57) ABSTRACT

An image processing apparatus comprises processing circuitry configured to: obtain a respective identity and location for each of a first plurality of landmarks in a reference volume; obtain a respective weighting for each landmark of the first plurality of landmarks; obtain a respective identity and location for each of a second plurality of landmarks in a further volume; and determine a transform based on a fit between the first plurality of landmarks and the second plurality of landmarks, wherein the fit is determined in dependence on the weightings.

20 Claims, 9 Drawing Sheets

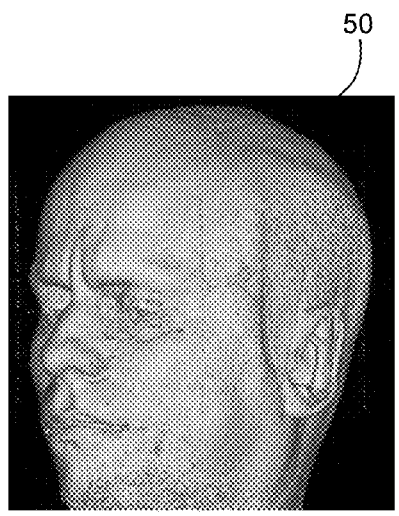
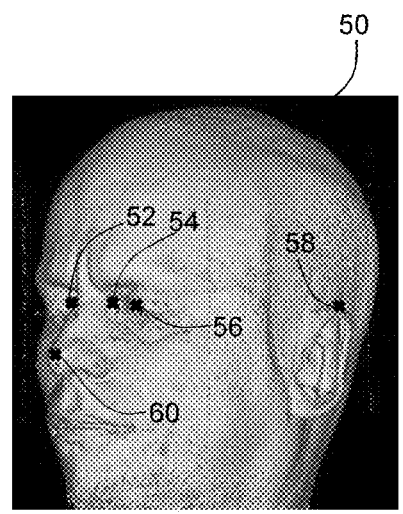
FIG. 3A
FIG. 3B

IMAGE RENDERING METHOD AND APPARATUS

FIELD

Embodiments described herein relate generally to an image rendering method and apparatus, for example comprising a landmark-based registration.

BACKGROUND

Volumetric medical imaging techniques that can produce three-dimensional medical imaging data using any of a variety of imaging modalities, for example CT, PET, MRI, ultrasound, and X-ray, are widely used for imaging or diagnostic purposes.

Volumetric medical image data may comprise a three-dimensional array of voxels, each voxel representative of a particular position in three-dimensional space and each voxel having one or more data values. For example in the case of CT data, each voxel may have an associated intensity value that is representative of the attenuation of the applied X-ray radiation provided at the location represented by the voxel. The intensity value may be referred to as an image value, gray value, gray level, voxel value or CT value. The intensity value may be measured in Hounsfield units (HU). Commonly used volume rendering techniques use a transfer function to map each of a series of sampled voxel values to an opacity value and a color value (usually represented by a combination of red, green and blue color values).

Three-dimensional volumetric rendering is an important part of visualization of medical images. Three-dimensional volumetric rendering may comprise using a rendering method, for example a ray-casting method, to render a two-dimensional image that provides an impression of a surface in three dimensions to the viewer. An impression of three dimensions may be provided by, for example, texture or shading effects.

Traditionally, three-dimensional volume rendered images may not often be used in diagnosis. However, the use of three-dimensional volume rendered images in diagnosis may now be becoming more common.

Three-dimensional volume rendered images may be useful for communication. Three-dimensional volume rendered images may be useful in interventional settings. Three-dimensional volume rendered images may be useful in cases where those looking at the data are not trained radiologists.

Three-dimensional volumetric rendering typically requires significantly more setup than the rendering of traditional two-dimensional views. A lot of setup may be required for three-dimensional volumetric rendering to look good, and be useful. The setup may require a user to make many choices and to set a number of parameter values.

Segmentation, camera positioning and orientation, registration, clipping, and material properties may all be important to the usefulness of a three-dimensional view.

The setup of the three-dimensional volumetric rendering takes time, which is always at a premium. Anything that can serve to streamline parts of the setup process may have a clear value as a result.

Existing presets focus on storing inputs. For example, a preferred transfer function and view orientation may be stored for future reuse.

BRIEF DESCRIPTION OF THE DRAWINGS

Embodiments are now described, by way of non-limiting example, and are illustrated in the following figures, in which:

FIG. 3A shows an example of a reference image;

FIG. 3B shows a set of landmarks on the reference image of FIG. 3A;

DETAILED DESCRIPTION

Certain embodiments provide an image processing apparatus comprising processing circuitry configured to: obtain a respective identity and location for each of a first plurality of landmarks in a reference volume; obtain a respective weighting for each landmark of the first plurality of landmarks; obtain a respective identity and location for each of a second plurality of landmarks in a further volume; and determine values for a transform based on a fit between the first plurality of landmarks and the second plurality of landmarks, wherein the fit is determined in dependence on the weightings.

Certain embodiments provide a method comprising obtaining a respective identity and location for each of a first plurality of landmarks in a reference volume; obtaining a respective weighting for each landmark of the first plurality of landmarks; obtaining a respective identity and location for each of a second plurality of landmarks in a further volume; and determining values for a transform based on a fit between the first plurality of landmarks and the second plurality of landmarks, wherein the fit is determined in dependence on the weightings.

Figure 1:
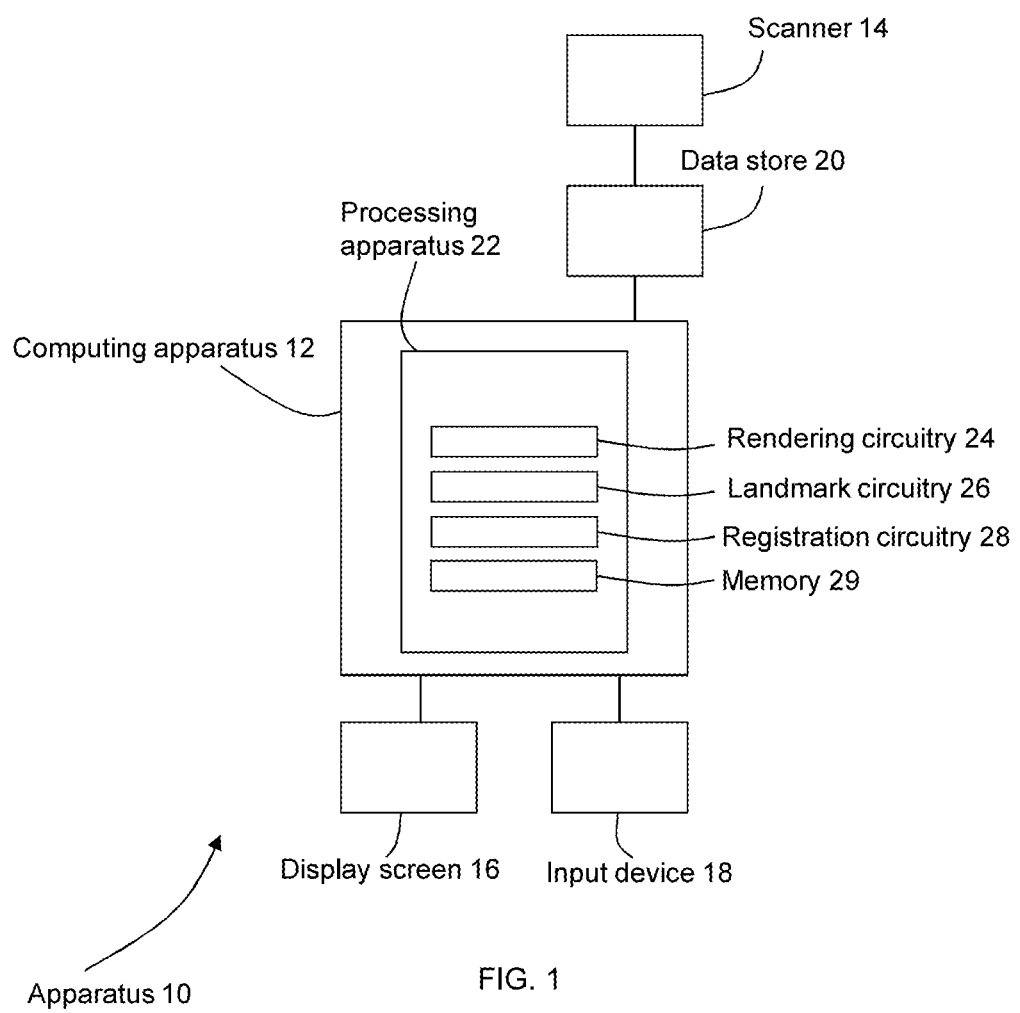
FIG. 1 is a schematic illustration of an apparatus in accordance with an embodiment.

A medical image processing apparatus 10 according to an embodiment is illustrated schematically in FIG. 1.

The medical image processing apparatus 10 comprises a computing apparatus 12, in this case a personal computer (PC) or workstation, which is connected to a scanner 14 via a data store 20.

The medical image processing apparatus 10 further comprises one or more display screens 16 and an input device or devices 18, such as a computer keyboard, mouse or trackball.

In the present embodiment, the scanner 14 is a CT (computed tomography) scanner which is configured to obtain volumetric CT scans. The scanner 14 is configured to generate image data that is representative of at least one anatomical region of a patient or other subject. The image data comprises a plurality of voxels each having a corresponding data value, which in the case of CT scanning is an intensity value, for example a value in Hounsfield units.

In other embodiments, the scanner 14 may be configured to obtain two-, three- or four-dimensional image data in any imaging modality. For example, the scanner 14 may comprise a magnetic resonance (MR) scanner, computed tomography (CT) scanner, cone-beam CT scanner, positron emission tomography (PET) scanner, X-ray scanner, or ultrasound scanner.

In the present embodiment, image data sets obtained by the scanner 14 are stored in data store 20 and subsequently provided to computing apparatus 12. In an alternative embodiment, image data sets are supplied from a remote data store (not shown). The data store 20 or remote data store may comprise any suitable form of memory storage. In some embodiments, the medical image processing apparatus 10 is not coupled to any scanner.

Computing apparatus 12 comprises a processing apparatus 22 for processing of data. The processing apparatus comprises a central processing unit (CPU) and Graphical Processing Unit (GPU). The processing apparatus 22 provides a processing resource for automatically or semi-automatically processing medical image data sets. In other embodiments, the data to be processed may comprise any image data, which may not be medical image data.

The processing apparatus 22 includes rendering circuitry 24 configured to render an image from volumetric image data, landmark circuitry 26 configured to identify and locate anatomical landmarks, registration circuitry 28 configured to register landmarks, and a memory 29. In other embodiments, the landmark circuitry 26 may be configured to identify and locate any suitable landmarks, which may not be anatomical.

In the present embodiment, the circuitries 24, 26, 28 and memory 29 are each implemented in the CPU and/or GPU by means of a computer program having computer-readable instructions that are executable to perform the method of the embodiment. In other embodiments, the circuitries may be implemented as one or more ASICs (application specific integrated circuits) or FPGAs (field programmable gate arrays).

The computing apparatus 12 also includes a hard drive and other components of a PC including RAM, ROM, a data bus, an operating system including various device drivers, and hardware devices including a graphics card. Such components are not shown in FIG. 1 for clarity.

Figure 2:
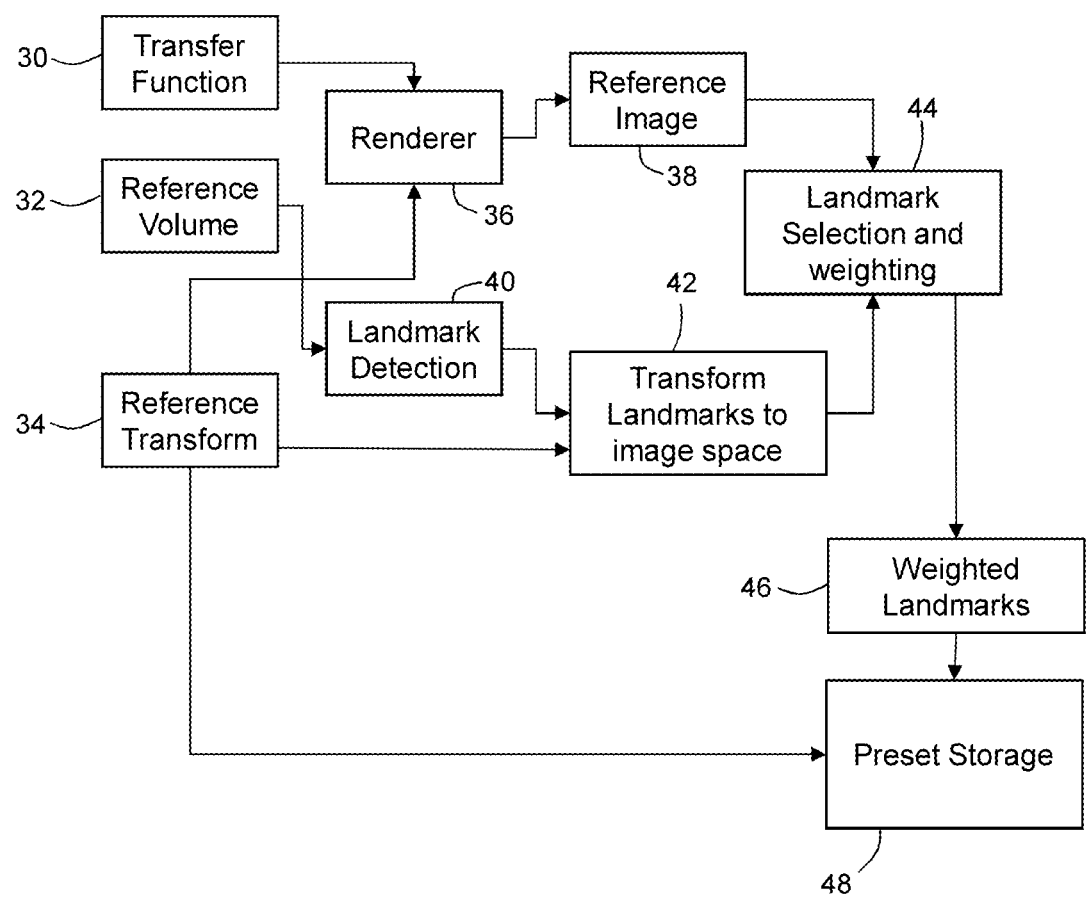
FIG. 2 is a flow chart illustrating in overview a landmark detection and weighting method in accordance with an embodiment.

FIG. 2 is a flow chart illustrating in overview a landmark detection and weighting method in accordance with an embodiment. The method of FIG. 2 is performed by the apparatus 10 of FIG. 1.

A rendering process is performed by a renderer 36 which is implemented by the rendering circuitry 24.

The renderer 36 receives as a first input a transfer function 30. The transfer function 30 maps voxel values to opacity values and color values. In some embodiments, the transfer function 30 may comprise a window width and window level.

The renderer 36 receives as a second input a reference volume 32. The reference volume 32 comprises a reference set of volumetric medical imaging data, which comprises a set of voxel intensity values and associated positions.

The renderer 36 receives as a third input a reference transform 34. The reference transform 34 comprises values for a set of transform parameters. The values for the set of transform parameters define how the rendering process 36 is to be set up.

In the present embodiment, the transform parameters comprise at least one camera positioning parameter which defines a position of a virtual camera relative to a coordinate space of the reference volume. The transform parameters comprise at least one view orientation parameter which defines an orientation of the virtual camera relative to the coordinate space of the reference volume. A view orientation may comprise one or more view orientation parameters.

The renderer 36 may also receive values for further inputs in addition to the first, second and third inputs above. The further inputs may include at least one frame extent parameter defining an extent of a frame.

The further inputs may include at least one segmentation parameter relating to a segmentation of at least one object within the reference volume. For example, the at least one segmentation parameter may comprise a threshold value used in the segmentation. The further inputs may include at least one clipping parameter which defines at least one clip plane used in the rendering. The further inputs may include lighting information. The lighting information may comprise at least one light position parameter representing a position of one or more virtual lights used in the rendering. The lighting information may include a bi-directional scattering function (BDSF).

The renderer 36 uses the rendering parameter values to set up the rendering process. The rendering process comprises rendering an image 38 from the reference volume 32 using the transfer function 30, and optionally further inputs such as segmentation, clipping and/or lighting information. In the present embodiment, the rendering comprises shaded volume rendering (SVR), which may be performed using any suitable rendering method. Global illumination may be used. In other embodiments, any suitable rendering method may be used.

The term reference scene may be used to refer to a version of the reference volume that has been processed by applying the transfer function 30 and optionally other functions such as segmentation, clipping or lighting. The reference scene is not associated with a particular view direction, orientation or frame extent.

The image 38 rendered from the reference volume 32 may be referred to as a reference image 38. The reference image 38 comprises a set of pixel values. The renderer 36 stores a set of pixel color values comprising a respective pixel color value for each pixel of the reference image 38.

The renderer 36 may also compute a depth map that comprises or represents a depth of each feature of the reference image in a direction perpendicular to the two-dimensional image space of the reference image.

The landmark circuitry 26 receives the reference volume 32 and performs a landmark detection process 40 to deduce a plurality of landmarks that are present in the medical data set of the reference volume 32. The landmark detection process 40 comprises processing the reference volume 32 to identify anatomical landmarks in the reference volume 32 and to determine a respective location of each anatomical landmark in the coordinate system of the reference volume 32.

Anatomical landmarks are recognizable points within the body's structure. In medical imaging, anatomical landmarks may be used as reference points, for example to align or register related images. Anatomical landmarks are defined in relation to anatomical structure such as bones, vessels or organs. A standard set of anatomical landmarks may be used, in which an anatomical definition of each anatomical landmark is predetermined by clinical experts.

The anatomical definition of a landmark may be used to locate that landmark in many different medical imaging data sets. For example, if the center of the right eye is determined as an anatomical landmark, the landmark at the center of the right eye may be located in any medical imaging data set in which the center of the right eye is present, by any manual or automatic method that can locate that point in the anatomy.

In the present embodiment, the landmark circuitry 26 detects the anatomical landmarks automatically using classifiers. In other embodiments, any other suitable method of landmark detection may be used. Methods of landmark detection may be as described in, for example, Mohammad A Dabbah, Sean Murphy, Hippolyte Pello, Romain Courbon, Erin Beveridge et al, 'Detection and location of 127 anatomical landmarks in diverse CT datasets', Proc. SPIE 9034, Medical Imaging 2014: Image Processing, 903415 (Mar. 21, 2014); doi:10.1117/12.2039157, which is hereby incorporated by reference.

The locations of the landmarks that are determined in the landmark detection process 40 are locations in a three-dimensional coordinate space of the reference volume 32.

The landmark circuitry 26 receives the reference transform 34 and performs a transformation 42 in which the landmark circuitry 26 uses the reference transform 34 to transform the locations of the landmarks in three-dimensional space to locations in a two-dimensional space of the reference image 38. The landmark positions are projected onto an image space. The image space comprises a two-dimensional space into which the landmarks are projected using values for at least one camera positioning parameter and at least one view orientation parameter of the reference transform 34. A depth of each landmark in a direction perpendicular to the two-dimensional space may also be determined.

When the locations of the landmarks are transformed into the two-dimensional image space, it may be the case that some of the landmarks are not visible in the rendered image. For example, a landmark may be positioned behind another anatomical feature in the rendered image, and so may not be visible. A landmark may be outside the bounds of a region that is represented on screen. A landmark may be hidden by another anatomical feature or by a rendering effect such as shading. A landmark may be removed by a clipping process defined by a clipping plane. A landmark may be hidden by an item added in post-processing, for example an inserted geometry. Landmarks having low or no visibility in the reference image 38 may still be used in subsequent stages of the method of FIG. 4.

The landmark circuitry 26 then performs a landmark selection and weighting process 44 using the reference image 38 and the locations of the landmarks in the two-dimensional space of the reference image 38. Landmarks are selected and weighted by visibility and importance.

In the present embodiment, the landmark circuitry 26 selects each landmark that was detected in the landmark detection process 40, and assigns a respective weighting for each landmark. The weighting may also be referred to as an importance weighting.

The weighting is based on visibility, salience, and importance to a diagnostic or interventional workflow. In other embodiments, any one or more of visibility, salience and importance to a diagnostic or interventional workflow may be used to determine the weighting. In further embodiments, any suitable factors may be used to determine the weighting.

The landmark circuitry 26 determines and stores a measure of each landmark's visibility in reference image 38. When assigning weightings, landmarks having higher visibility are assigned greater importance than landmarks having lower visibility, for example landmarks that are occluded.

The landmark circuitry 26 may determine which landmarks are positioned in front of, or behind, other landmarks or other anatomical features or image features when viewed from a viewing direction determined by the reference transform 34. The landmark circuitry 26 may use a depth map obtained by renderer 36 to determine the landmark depths. A landmark may be assigned a higher weighting if it appears at the front of the scene than if it appears further back in the scene.

The weighting is based on a salience of the landmark in the rendered reference scene. Features that are salient may be features that are relevant or significant to a user.

A landmark may be considered to have a higher visibility or salience if a feature with which the landmark is associated has a large size in the reference image, and to have a lower visibility or salience if the feature with which it is associated has a smaller size in the reference image. The landmark may be considered to have higher visibility or salience if it is nearer the center of the view shown in the reference image, and to have lower visibility or salience if it is nearer an edge of the view shown in the reference image. It may be assumed that a large, central landmark in the reference image is a landmark that is considered to be significant by a creator of the reference image, and may therefore be considered to be highly salient.

In the present embodiment, visibility is determined by multiplying a set of normalized values. A first normalized value represents a distance from center of view. A second normalized value represents presence within the camera view. A third normalized value represents distance behind a rendered volume surface. A fourth normalized value represents opacity of a landmark region. A fifth normalized value represents an associated feature object size on screen. A sixth normalized value represents whether the point has been clipped or not. In other embodiments, any suitable value may be used. Weighting is based on the determined visibility.

In some embodiments, the landmark circuitry 26 assigns a higher weighting to features that are important to a given, predetermined diagnostic or interventional workflow. A predetermined workflow may be a workflow that is selected automatically when a user opens a given data set.

If seeing a landmark is known to be particularly important for a diagnosis that is to be performed, that landmark may be considered to be of high importance for the purpose of landmark weighting. If seeing a landmark is known to be particularly important for a workflow that is to be performed, that landmark may be considered to be of high importance for the purpose of landmark weighting.

In some embodiments, the landmark circuitry 26 selects and weights only some of the landmarks that are detected in the landmark detection process 40. For example, the landmark circuitry 26 may select and weight only landmarks that are relevant to a particular diagnosis. The landmark circuitry 26 may not output any weights for landmarks that are not selected, or may set weights for landmarks that are not selected to zero.

An output of the landmark selection and weighting process 44 is a set of weighted landmarks 46. Each landmark has an associated position in the image space, which was determined in the transformation 42 of the landmark location that was determined in the landmark detection process 40. Each landmark also has an associated weighting which was determined in the landmark selection and weighting process 44.

In the present embodiment, the weighted landmarks 46 are formatted as follows:
Landmark 1 [Position] [Weighting]
Landmark 2 [Position] [Weighting]
Landmark N [Position] [Weighting]

In other embodiments, any suitable format may be used.

The weighted landmarks 46 may also be referred to as a reference landmarks, or as weighted reference landmarks.

The weighted landmarks 46 and the reference transform 34 are stored in preset storage 48. In some embodiments, a measure of visibility for each landmark is also stored. In the present embodiment, the preset storage 48 forms part of memory 29. The transfer function 30 may also be stored in preset storage 48.

It is noted that the reference image is not stored in the preset storage 48. By storing the landmarks without the reference image, data security and privacy may be ensured. The reference image may represent patient information that may be identifiable to a patient. Not storing the reference image may mean that patient information is not transferred between the apparatus 10 creating the preset and any other apparatus to which the preset is subsequently imported.

In general, a preset may comprise a set of rendering parameter values. When a user selects the preset, the rendering parameter values may be applied automatically. The use of a preset may save time over selecting values for individual imaging parameters.

The reference transform 34 and weighted landmarks may be considered to form a preset, since the reference transform and weighted landmarks may be used to render a further image as described below.

The transfer function 30 may also form part of the preset. In some embodiments, other parameters such as lighting parameters or segmentation parameters may also form part of the preset. The reference transform 34 and weighted landmarks 46, and optionally the transfer function 30, may be used to render an image that replicates an appearance of the reference image, for example using a method as described below with reference to FIG. 4.

FIG. 3A shows an example 50 of a reference image generated from a reference volume using a transfer function and reference transform. The reference image 38 is an image of a head of a subject, for example a patient.

FIG. 3B shows a placement of a plurality of detected landmarks 52, 54, 56, 58, 60 on the reference image 50. Landmark 52 is the right eye. Landmark 54 is the right ear tip. Landmark 56 is the left eye. Landmark 58 is the left ear tip. Landmark 60 is the nose tip. The landmarks 52, 54, 56, 58, 60 are detected using a landmark detection process 40 as described above and are transformed to the image space of image 50 using by performing a transformation 42 using a reference transform.

The landmarks are weighted by importance, which includes weighting by visibility. In the example shown in FIG. 3B, landmarks 52 and 56 are given a high weight. Landmarks 58 and 60 are given a medium weight. Landmark 54 is given a low weight, because it is concealed from view in the reference image 50. Landmark 54 relates to an ear that is occluded in the reference image 50. The occluded ear is weighted as less important than the other specified points.

Figure 4:
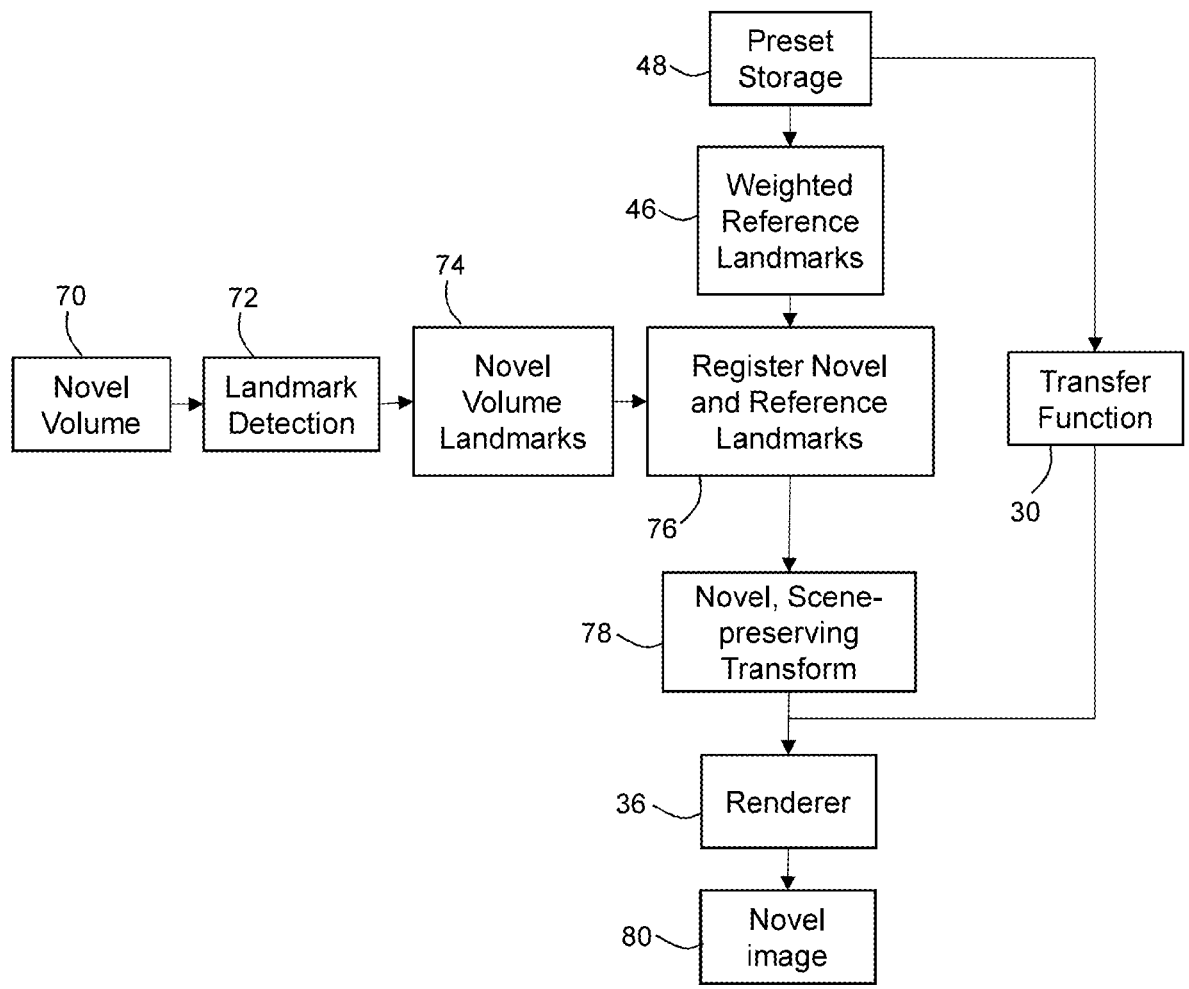
FIG. 4 is a flow chart illustrating in overview a method of weighted landmark-based registration in accordance with an embodiment.

FIG. 4 is a flow chart illustrating in overview a method of weighted landmark-based registration in accordance with an embodiment. The method of FIG. 4 is performed by the apparatus 10 of FIG. 1.

A novel volume 70 is received by the landmark circuitry 26. The novel volume 70 comprises a set of volumetric medical imaging data, which comprises a set of voxel intensity values and associated positions. For example, the novel volume 70 may have been obtained from a recent medical scan performed by the scanner 14. In some embodiments, the novel volume may comprise data acquired using a different imaging modality from the modality used to acquire the reference volume.

The novel volume 70 is a volume on which a rendering is to be performed. It is intended that the rendering of the novel volume 70 will result in an image that is similar in appearance to the reference image 38.

The novel volume 70 is input to a landmark detection process 72. The landmark detection process 72 comprises processing the novel volume 70 to identify a plurality of anatomical landmarks in the novel volume 70 and to determine a respective location of each anatomical landmark in the coordinate system of the novel volume 70. In the landmark detection process 72, landmarks in the novel dataset of the novel volume are deduced.

In the present embodiment, the landmark detection process 72 that is performed on the novel volume 70 is the same as the landmark detection process 40 that was performed on the reference volume 32. In other embodiments, a different landmark detection process may be used.

In the present embodiment, it is not required that all of the landmarks identified in the novel volume 70 are the same as the landmarks identified in the reference volume 32. There are required to be some landmarks in common between the novel volume 70 and the reference volume 32. However, there may be landmarks that are present in the novel volume 70 that are not present in the reference volume 32 and/or landmarks that are present in the reference volume 32 that are not present in the novel volume 70.

The landmark detection process 72 outputs a set of novel volume landmarks 74 comprising a respective identification and location of each of the landmarks that were detected in the novel volume 70.

The registration circuitry 28 receives the novel volume landmarks 74 from the landmark circuitry 26. The registration circuitry 28 receives a preset comprising the set of weighted reference landmarks 46 from the preset storage 48. In other embodiments, weighted reference landmarks may be received from any suitable storage. The storage in which the weighted reference landmarks are stored may not form part of the apparatus 10. For example, a preset may be determined using one apparatus, transferred to a further apparatus, and used by the further apparatus to render novel images.

The registration circuitry 28 performs a registration process 76 to register the novel volume landmarks 74 and the weighted reference landmarks 46. The registration process 76 may also be described as a fitting process to obtain a fit between the novel volume landmarks 74 and weighted reference landmarks 46. In other embodiments, any suitable fitting process may be used.

The registration process 76 comprises a weighted landmark-based registration. As part of the registration process 76, the rendering circuitry 24 renders images from the novel volume 70 using a succession of different camera transforms. Each camera transform comprises a respective camera look matrix which comprises a camera position and view orientation. The camera position comprises a value for at least one camera positioning parameter. The view orientation comprises a value for at least one view orientation parameter.

The registration circuitry 28 iterates parameters of the camera transform until a minimum energy configuration is obtained, as described below with reference to FIGS. 5A to 5C. In other embodiments, any suitable method of iterating parameters of the camera transform may be used. Any suitable set of rendering parameters may be used to render images from the novel volume, and any of the rendering parameters may be iterated to obtain a minimum energy configuration.

The camera transform associated with the minimum energy configuration is considered to be the closest camera transform to the reference transform 34. This definition of the closest transform uses the distances between the novel volume landmarks 74 and their corresponding reference landmarks 46, and weights the distances in accordance with the importance of each landmark. In other embodiments, any suitable measure may be used to determine a closest transform.

Figure 5A:
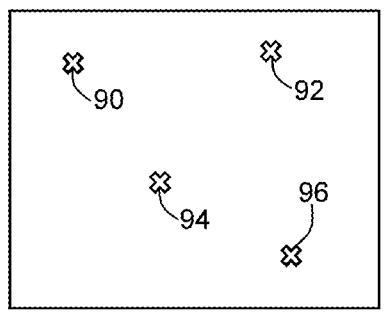
FIG. 5A is a schematic illustration showing positions of a set of reference landmarks in image space.
Figure 5B:
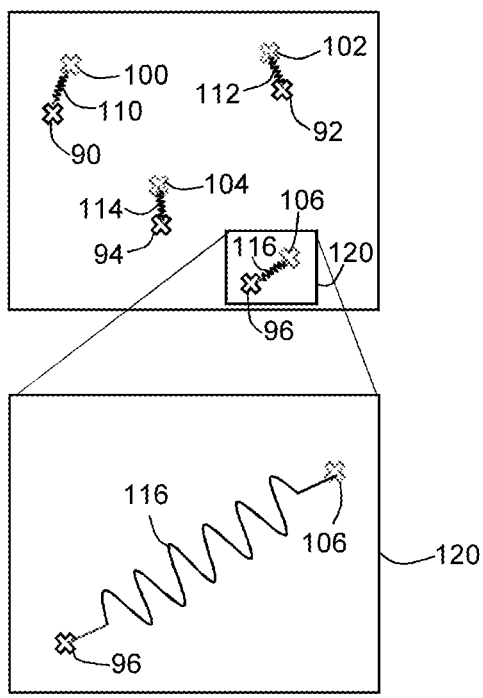
FIG. 5B is a schematic illustration showing positions of a novel set of landmarks as well as the set of reference landmarks of FIG. 5A.

FIG. 5A shows positions of a set of reference landmarks 90, 92, 94, 96 in image space. FIG. 5B shows positions of a novel set of landmarks 100, 102, 104, 106 as well as the set of reference landmarks 90, 92, 94, 96. The positions of the novel set of landmarks 100, 102, 104, 106 in image space are obtained by rendering an image from the novel volume 70 using a camera transform. Positions of the novel landmarks in image space are iterated by iterating parameters of the camera transform.

Connections between reference landmarks 90, 92, 94, 96 and their corresponding novel landmarks are modelled as a set of springs 110, 112, 114, 116. An inset 120 in FIG. 5B enlarges one pair of landmarks 96, 106 and the spring 116 between them. The weighted landmark-based registration comprises finding a minimum energy configuration of the set of springs. The minimum energy configuration of the set of springs is considered to be the closest camera transform to the reference one.

Figure 5C:
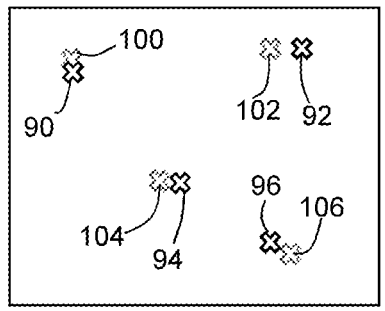
FIG. 5C is a schematic illustration of the set of reference landmarks and novel landmarks of FIG. 5B after optimization.

FIG. 5C illustrates a result of the weighted landmark-based registration. The relative positions of reference landmarks 90, 92, 94, 96 and novel landmarks 100, 102, 104, 106 are changed in accordance with the registration.

In the present embodiment, the registration circuitry 28 computes the minimum-energy registration in image space using the following equation:

$$\sum E_{landmark}(V_{forward}, V_{up}, V_{right}, V_{at}) = \sum \frac{k\|P_{v\_new}(V_{forward}, V_{up}, V_{right}, V_{at}) - P_{v\_old}\|^2}{2} \quad \text{(Eqn. 1)}$$

$P_{v\_old}$ is a position of a landmark in the two-dimensional space of the reference image. $P_{v\_new}$ is a position of a corresponding landmark in the two-dimensional space of an image rendered from the novel volume 70. $P_{v\_new}$ depends on the camera transform used to render the image.

$$P_{v\_new}(V_{forward}, V_{up}, V_{right}, V_{at}) = P_{w\_new} M_{world-view}(V_{forward}, V_{up}, V_{right}, V_{at})$$

$M_{world-view}(V_{forward}, V_{up}, V_{right}, V_{at})$ is the camera look matrix world-to-view. $V_{forward}, V_{up}, V_{right}, V_{at}$ are a set of camera look criteria. $V_{forward}$ is a forward vector and specifies a direction in which the camera is looking in terms of angles. $V_{up}$ is an up vector. $V_{right}$ is a right vector. $V_{up}$ and $V_{right}$ specify the camera orientation in space. $V_{at}$ specifies a point in space that the camera is looking at, so that the camera can be properly located. $V_{at}$ will lie somewhere on the forward vector $V_{forward}$, forward of the point from where the camera is conceptually placed.

k is a spring stiffness coefficient. A respective stiffness for each spring is determined based on the weighting assigned to the corresponding reference landmark. If the reference landmark has been assigned a high weighting, the spring stiffness coefficient is higher than if the reference landmark has been assigned a lower weighting.

In summary, Equation 1 models a relationship between a reference landmark image-space location and a novel landmark image-space location using spring equations. Stiffness of the spring equations is derived from importance weighting. Equation 1 sums over all the landmarks, but those with higher spring stiffness have a higher contribution to the overall energy. The registration circuitry 28 minimizes the total energy over all springs by iterating the camera look matrix until a minimum energy configuration is found.

Turning back to FIG. 4, when the registration process 76 is complete, the registration circuitry 28 outputs a transform 78 which may be described as a novel scene-preserving transform. The transform 78 comprises the camera transform that was used to obtain the minimum energy configuration in the registration process 76 and was considered to be the closest camera transform. The transform 78 orients the novel landmarks as close as possible to the reference landmarks. The transform 78 provides the best possible fit between the novel landmarks and the reference landmarks.

The renderer 36 receives the novel, scene-preserving transform 78 from the registration circuitry 28.

The renderer 36 receives the transfer function 30 from preset storage 48. In other embodiments, any suitable transfer function may be used.

The renderer 38 uses the novel, scene-preserving transform 78 and the transfer function 30 to render a novel image 80. The novel image 80 is displayed to a user. In some embodiments, a reference image for the weighted reference landmarks 46 is displayed along with the novel image 80. The reference image and the novel image 80 may be overlaid, for example to allow a user to compare features of the novel image 80 with features of the reference image.

The process of FIG. 4 may be considered to replicate an appearance of the reference image rather than replicating inputs such as view orientation. Since medical imaging scans differ, setting up different images using the same set of inputs may not result in a similar output. For example, setting up different images using the same transform may not always result in images having the same appearance.

By using the registration process of FIG. 4, a transform may be obtained that has a similar output to the reference image that is output by the reference transform.

Rather than matching a location or orientation of the original data, an aim of the registration is to match a look of the resulting image. With weighting that is based on importance, for example on visibility, unimportant regions of the image may be ignored when attempting to create a similar look.

Using the process of FIG. 4 may save a radiologist time in setting up rendering parameters. In some embodiments, values at least some rendering parameters are determined automatically without the radiologist's input. In some embodiments, initial values input by the radiologist are automatically adjusted, for example optimized.

In some embodiments, an optimization may be performed in response to a single user input, for example a single button press.

Use of three-dimensional volumetric rendering may be made quicker and more straightforward by automatically determining values for at least some rendering parameters. More useful views may be obtained. Less effort may be required to set up the views. Setup may be streamlined.

A reference transform and weighted landmarks may be used as a type of preset that aims to reproduce an appearance rather than merely replicating inputs.

In some embodiments, multiple presets are stored in the memory 29. A user, for example a radiologist, selects one or more of the presets for use in rendering a novel volume. In some circumstances, the radiologist may view reference images rendered from the reference transforms and select one or more of the reference images that have a desired appearance. A reference image having a desired appearance may be a reference image that shows landmarks of interest. A reference image having a desired appearance may be a reference image that provides a good view of an anatomy or pathology of interest.

For each selected reference transform, the registration circuitry 24 performs a registration process to obtain a transform that replicates an appearance of the reference transform. The rendering circuitry 24 uses the transform to render an image from the novel volume.

In the description above, all stages of FIG. 2 and FIG. 4 are performed by the apparatus 10. In other embodiments, different apparatuses may perform different parts of the method of FIG. 2 and/or the method of FIG. 4. The different apparatuses may be different physical machines or different applications. In some embodiments, different ones of the rendering circuitry 24, landmark circuitry 26, registration circuitry 28 and memory 29 are provided by different apparatuses.

Figure 6A:
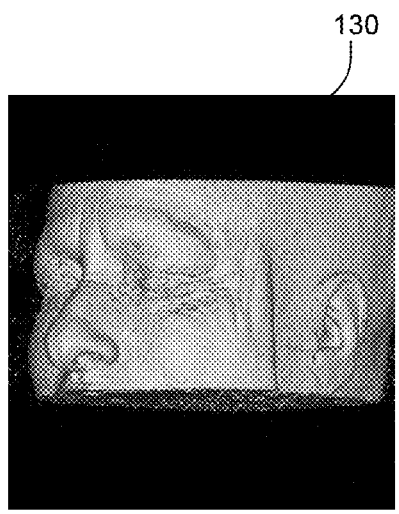
FIG. 6A is an example of a rendered image.

FIG. 6A is an example of an initial image 130 rendered from a novel volume that is to be registered with the reference image 50 shown in FIGS. 3A and 3B.

Figure 6B:
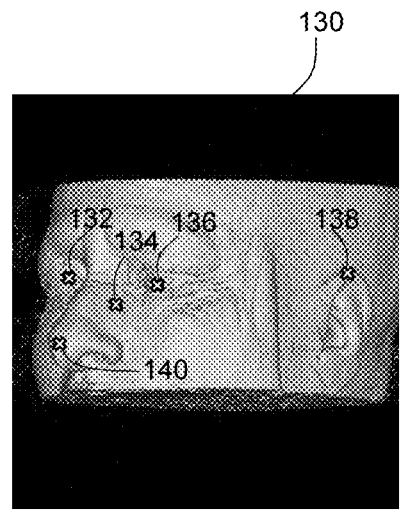
FIG. 6B shows the rendered image of FIG. 6A overlaid with landmarks detected in the rendered image.

The landmark circuitry 26 detects landmarks 132, 134, 136, 138, 140 in the novel volume. The landmarks 132, 134, 136, 138, 140 correspond to the same anatomy as the landmarks 52, 54, 56, 58, 60 that were detected in the reference volume used to render the reference image 50 of FIGS. 3A and 3B. For example, landmarks 140 and 60 each represent the tip of the nose. The landmarks 132, 134, 136, 138, 140 that are detected in the novel volume are shown in FIG. 6B, in which they are overlaid on the initial image 130.

Figure 6C:
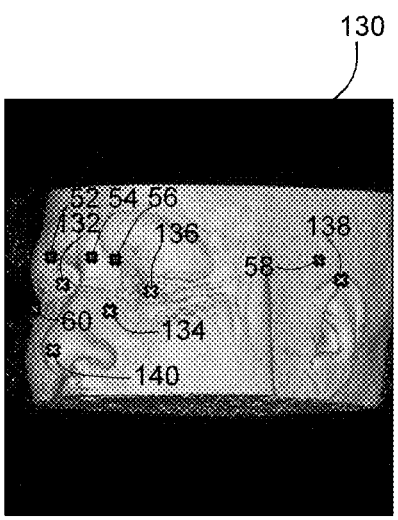
FIG. 6C shows the rendered image of FIG. 6A overlaid with the detected landmarks of FIG. 6B and reference landmarks.

The registration circuitry 28 loads reference landmarks 52, 54, 56, 58, 60 and their expected locations in image space and weights. FIG. 6C shows positions of the reference landmarks 52, 54, 56, 58, 60 overlaid on the initial image 130, along with the positions of the landmarks 132, 134, 136, 138, 140 that were detected in the novel volume.

The registration circuitry 28 performs a weighted landmark-based registration as described above to match a view of the novel volume to the view of the reference image. An energy configuration is minimized, wherein the energy configuration is obtained by modelling distances between the novel landmarks and their corresponding reference landmarks using spring equations that are weighted in accordance with the importance of each landmark. The rendering circuitry 28 renders a matched view 150 from the novel volume using a camera transform obtained by the weighted landmark-based registration.

Figure 6D:
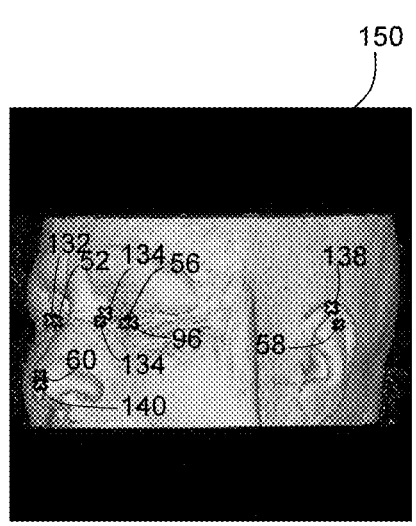
FIG. 6D shows an image that is obtained by registration using the detected landmarks and reference landmarks shown in FIG. 6C.

FIG. 6D shows the matched view 150. It may be seen that in the matched view 150, the landmarks 132, 134, 136, 138, 140 are closer to the reference landmarks 52, 54, 56, 58, 60 than in the initial image 90. The face shown in image 130 is oriented differently from the face shown in image 90, such that the orientation of the face is more similar to the orientation of the face that is shown in the reference image 50.

Figure 7A:
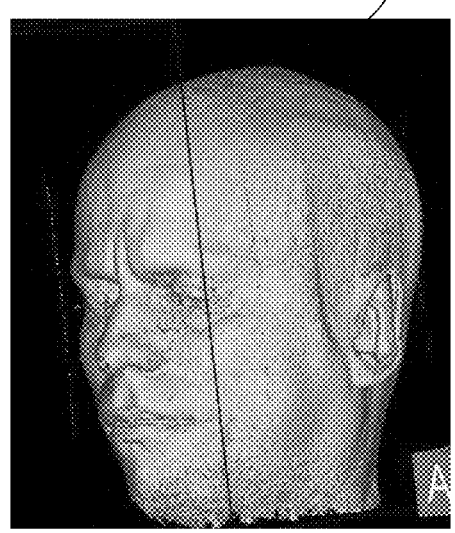
FIG. 7A shows an example of a reference image.
Figure 7B:
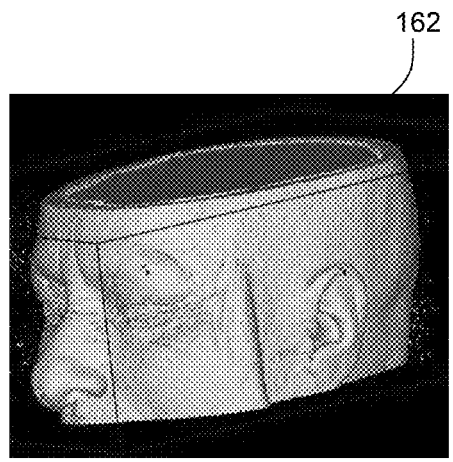
FIG. 7B shows an example of an initial image rendered from a novel volume.

FIG. 7A shows a further example of a reference image 160. The reference image 160 is an image of a head. FIG. 7B shows an example of an initial image 162 rendered from a novel volume, which is to be oriented by registration of landmarks of the novel volume with reference landmarks of the reference image. Initial image 162 is also an image of a head. It may be seen that the initial image 162 of FIG. 7B does not show as large a proportion of the head as the reference image 160 of FIG. 7A.

Both reference image 160 and initial image 162 contain similar features, but not all landmarks that are present in reference image 160 are present in initial image 162. It may be difficult to register the reference image 160 and initial image 162 using traditional registration methods.

Figure 7C:
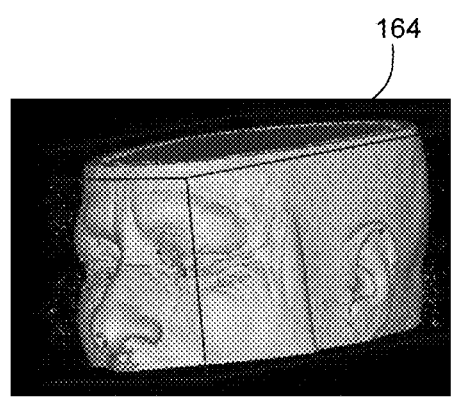
FIG. 7C shows an image rendered from the novel volume using a method according to an embodiment.

FIG. 7C shows an image 164 obtained by registration of the landmarks of the novel volume with the reference landmarks of the reference image using a method as described above with reference to FIG. 4. It may be seen that a similarity in appearance between the image 164 and the reference image 160 is greater than a similarity in appearance between the initial image 162 and the reference image 160. In particular, the heads of image 164 and reference 160 are shown from a similar angle, so that similar features are visible.

In an embodiment described above with reference to FIG. 4, a camera transform is optimized to provide a rendered image. In other embodiments, any suitable parameters may be optimized using a fitting method as described above.

In embodiments described above, landmarks are identified and located. In other embodiments, other scene elements may be defined in a landmark relative space. The landmark relative space is a coordinate space that is defined relative to a set of landmark positions. For example, clip planes, boxes, regions of interest and/or paths may be positioned in a landmark relative space. By defining positions of scene elements relative to a set of landmarks, the scene elements may then be placed in any volume having a corresponding set of landmarks. For example, scene elements placed within the novel volume in such a way as to be similar to corresponding scene elements defined within the reference volume.

A plane, for example a clip plane, may be specified using x, y and z values and a point on the plane. A box may be described as a combination of planes. Clip planes or boxes may be considered to be analogous to orthographic projection planes. A plane may be positioned within a novel volume in approximately the same place as a plane in the reference volume, by using the determined landmark positions in the reference volume and in the novel volume and using a position of the clip plane defined relative to the landmarks.

A region of interest may be defined in a landmark relative space. The region of interest may comprise a user-defined point or region within a volume. For example, a region may be defined by a point and a radius from the point. By defining a region of interest relative to landmark positions, a region of interest may be positioned within the novel volume that is in approximately the same position as a corresponding region of interest within the reference volume or another volume, for example encompassing the same anatomy.

A path may be broken down into a set of points, where each point is treated as a region of interest.

In some embodiments, scene elements may be positioned without access to original data of a reference volume. Presets may be specified using a reference volume, which may also be referred to as a source volume. The specifying may be performed offline, for example in a system that is not accessible to an end user of the registration method. Presets may be shared without a need to share the source volume. The presets may comprise, for example, camera presets, region of interest presets, or clip presets.

Sharing of presets without sharing a source volume from which the preset is derived may allow sharing of custom presets between users or between applications. Sharing of presets without sharing a source volume from which the preset is derived may allow for creation of presets by application vendors for specific workflows.

In embodiments described above with reference to FIGS. 3A, 3B and 6A to 7C, the images are images of the head. In other embodiments, the images may be images of any appropriate anatomy. Any suitable landmarks may be used.

For example, in some embodiments, the reference image is an image of the heart. The method of FIG. 4 may be particularly suitable for showing images of the heart. Standardized views of the heart are specified relative to the heart, and so may be different for each individual. By using a reference image and performing landmark-based registration, the correct views may be obtained more easily and/or with reduced set up time. By weighting heart landmarks highly, the position and orientation of the heart in the scene can be tightly constrained, while the structures surrounding it can be positioned more flexibly. Examples of heart landmarks include the pulmonary valve, the mitral valve, the tricuspid value and the apex, which is the tip of the lower portion of the heart.

In other embodiments, the method of FIG. 4 is used to approximate traditional X-ray views from CT data. For example, the views may be views of knees, ankles or wrists. Landmarks around a specific area of interest would be prioritised to yield a view similar to a standard 2D x-ray view.

In some embodiments, an iterative solution is used to yield at least one automatic preset opacity parameter, for example an automatic preset opacity window level.

In one such embodiment, a view is recreated with landmark weightings only dependent on a predetermined importance. For example, an importance of each landmarks may be based on an importance of the landmark to a reference cardiac workflow. Visibility of the landmarks is not considered in this step. For example cardiac landmarks may be given a high weighting when viewing the heart. Other nearby anatomical features may not need to be similarly located.

The view that is recreated is expected to result in a scene that is located similarly to a reference scene. It is possible that transfer functions and/or opacity may be incorrect.

The registration circuitry 26 may iteratively solve for an opacity window width and/or window level that produces a closest match in landmark visibility weighting.

In some embodiments, a camera positioning may then be redone using landmarks weighted by both importance and visibility, using the new opacity transfer function.

Figure 8:
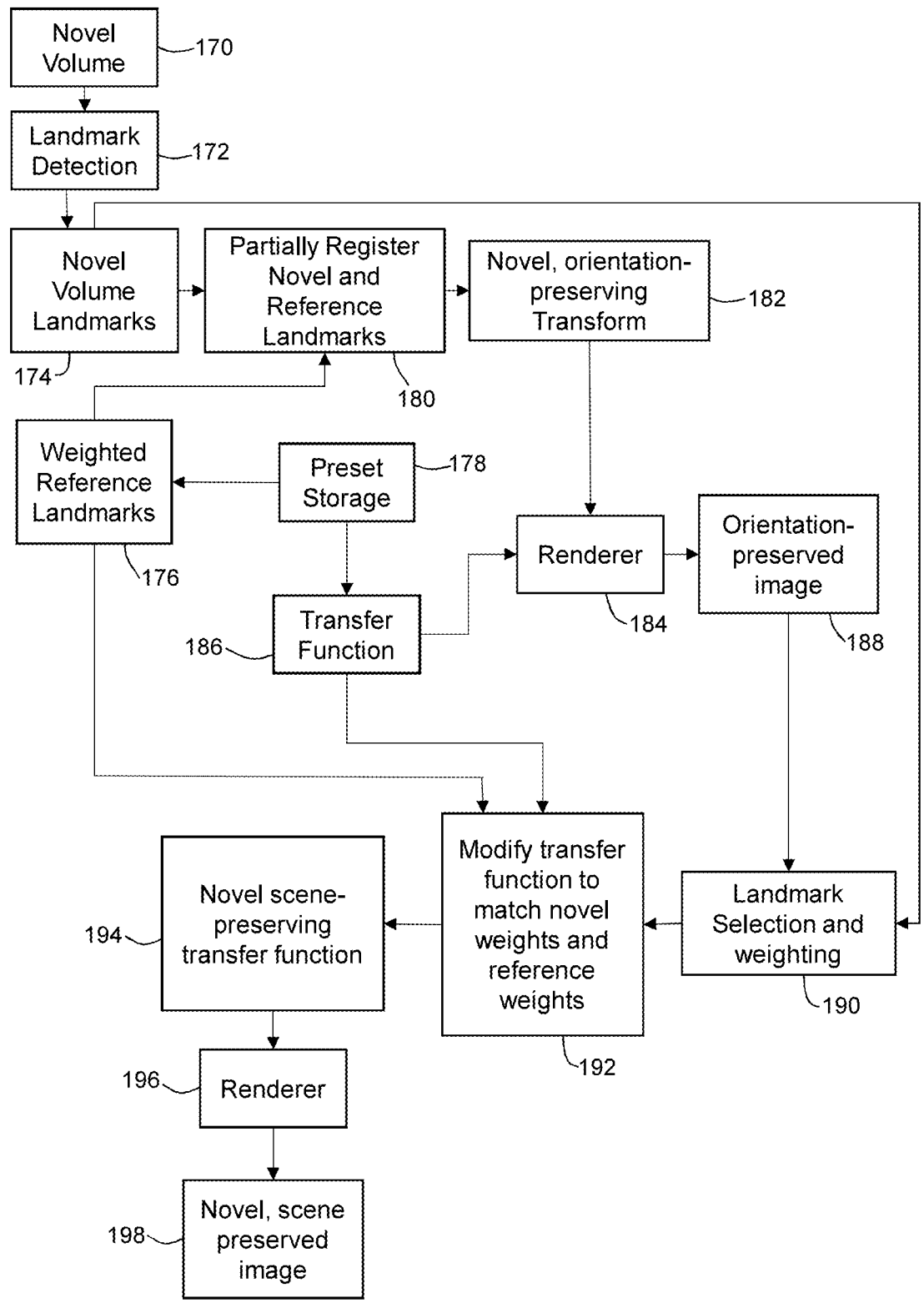
FIG. 8 is a flow chart illustrating in overview a method of a further embodiment.

FIG. 8 is a flow chart illustrating in overview a method of an embodiment. The method of FIG. 8 may be used, for example, in cases which a stored transfer function does not closely match data onto which a scene preset is being applied.

A novel volume 170 is received by the landmark circuitry 26. The novel volume 170 is input to a landmark detection process 172. The landmark detection process 172 comprises processing the novel volume 170 to identify a plurality of anatomical landmarks in the novel volume 170 and to determine a respective location of each anatomical landmark in the coordinate system of the novel volume 170.

The landmark detection process 172 outputs a set of novel volume landmarks 174 comprising a respective identification and location of each of the landmarks that were detected in the novel volume 170.

The registration circuitry 28 receives the novel volume landmarks 174.

Preset storage 178 stores a preset comprising a set of weighted reference landmarks 176, a reference transform, and a transfer function 186. The preset may have been obtained using a method as described above with reference to FIG. 2.

The registration circuitry 28 receives the set of weighted reference landmarks 176 from preset storage 178.

The registration circuitry 28 performs a partial registration process 180 to register the novel volume landmarks 174 and the weighted reference landmarks 176. The partial registration process 180 comprises a weighted landmark-based registration in which landmarks are weighted only by importance and not by visibility. For example, the registration circuitry 28 may not use any part of the weightings of the landmarks that was obtained by weighting in accordance with visibility. The registration circuitry 28 may only use weightings that were obtained by weighting in accordance with importance, for example in accordance with importance to a diagnosis or workflow.

A registration method used in the partial registration process 180 may be similar to the registration method described above with reference to FIG. 4 and FIGS. 5A to 5C. In other embodiments, any suitable registration method may be used.

The partial registration process 180 outputs a novel transform 182. The novel transform 182 may be considered to be orientation-preserving but not scene-preserving. Because visibility has not been considered in the weightings used to perform the partial registration process 180, use of the transform 182 that is output from the partial registration process 180 may not result in a similarity of appearance with regard to visibility.

The transform 182 is passed to a renderer 184 which is implemented by the rendering circuitry 24. The renderer 184 also receives the transfer function 186 from the preset storage 178. The renderer 184 performs a rendering process in which an image 188 is rendered from the novel volume 170 using the transform 182 and the transfer function 186. The image 188 may be described as an orientation-preserved image. The image 188 has an orientation similar to that of a reference image from which the weighted reference landmarks were preserved. However, the image 188 may not look the same as the reference image. For example, the image 188 may be lighter or darker than the reference image. The image 188 may have more or less contrast than the reference image.

The landmark circuitry 26 receives the orientation-preserved image 188. The landmark circuitry 26 performs a landmark selection and weighting process 190 using the novel volume landmarks 174 and the orientation-preserved image.

A method of landmark selection and weighting used in the landmark selection and weighting process 190 may be similar to a method used in the landmark selection and weighting process 44 described above with reference for FIG. 2. However, the landmark selection and weighting process 190 of FIG. 8 is performed on the novel volume 170 and orientation-preserved image 188 rather than being performed on a reference volume and reference image.

In the landmark selection and weighting process 190, the landmark circuitry 26 weights each landmark of the novel volume landmarks 174 in accordance with both importance and visibility. The weightings determined for the landmarks at stage 190 are different from the weightings of the corresponding reference landmarks. The visibility weighting of the novel volume landmarks 174 is based on the visibility of the novel volume landmarks 174 in the image 188.

The rendering circuitry 24 then performs a modification process 192 in which the rendering circuitry 24 modifies the transfer function 186 to match the landmark weightings obtained in the landmark selection and weighting process 190 with the weightings of the weighted reference landmarks 176. For example, the transfer function 186 may be modified to change a window width. The transfer function 186 may be modified to change a window level. The transfer function 186 may be referred to as an opacity transfer function. Window width and window level may be referred to as opacity parameters.

The modifying of the transfer function 186 may be iterative. The modification process 192 may comprise optimizing the transfer function to yield a highest possible similarity in landmark visibility when compared to the reference image. An output of the modification process 192 is a modified transfer function.

A novel scene-preserving function 194 comprises the modified transfer function and the novel orientation-preserving transform 182.

A renderer 196 performs a rendering of the novel volume 170 using the novel scene-preserving function 194 to obtain a rendered image 198. The rendered image 198 may be referred to as a novel, scene-preserved image. The renderer 196 is implemented in the rendering circuitry 24 and may be the same as the renderer 184.

Determining at least one opacity parameter may be particularly useful for modalities such as MR in which transfer functions may vary. For example, transfer functions used in MR may be less consistent than transfer functions used in CT. There may be more need to optimize transfer functions when registering MR images than when registering CT images.

In some circumstances, data values of the novel volume may be offset from data values of the reference volume in terms of actual numerical values. Such an offset may result in stored transfer functions applying a very different look to the novel volume compared to the reference. As the transfer functions include opacity components, this may result in regions being hidden not because the orientation is incorrect, but merely because the transfer function is being incorrectly applied to the novel data due to the offset. In the embodiment of FIG. 8, only importance is considered initially. The novel volume is oriented as closely as possible to the reference, even though the look may be very different. The process of FIG. 8 then attempts to account for the offset in data values by shifting the transfer functions, which should result in a corrected visibility. Once visibility is improved, the energy equation may be solved once more with both visibility and importance considered, which may result in a more similar look to the reference.

In some embodiments, a reference image is rendered from a reference volume obtained using a first modality. A novel volume is acquired using a second, different modality. The registration circuitry 28 performs a landmark-based registration of landmarks of the reference image and landmarks of the novel volume, for example using the method of FIG. 4 or the method of FIG. 8. In some embodiments, the rendering circuitry 24 renders an image in which the reference image is overlaid with a novel image rendered from the novel volume. A stored reference volume and a novel volume may be rendered simultaneously, but sourced from different modalities, for example CT as a reference, with live Ultrasound capture overlaid on top.

Determining at least one opacity parameter, for example using the method of FIG. 8, may be useful for multi-modality scene recovery, for example CT and ultrasound. In some embodiments, a transfer function used to render the reference image may be inappropriate for rendering the novel image, because it applies to a different modality.

In some embodiments, landmark-based registration is used to register images of a live acquisition with a previously-acquired scan image. For example, the method of FIG. 4 or the method of FIG. 8 may be used to register data obtained in a live acquisition to data obtained in a previous scan. For example, a reference image may be rendered from pre-operative scan data, and images rendered from frames of live data may be registered with the reference image. In some embodiments, the reference image and live images are obtained using the different modalities. For example, the reference image may obtained using CT and the live images may be obtained using ultrasound.

In some embodiments above, visibility is used as a weighting factor when determining landmark weightings. In further embodiments, visibility is used as a fourth displacement dimension when modelling distances between reference landmarks and novel landmarks using spring equations.

Figure 9A:
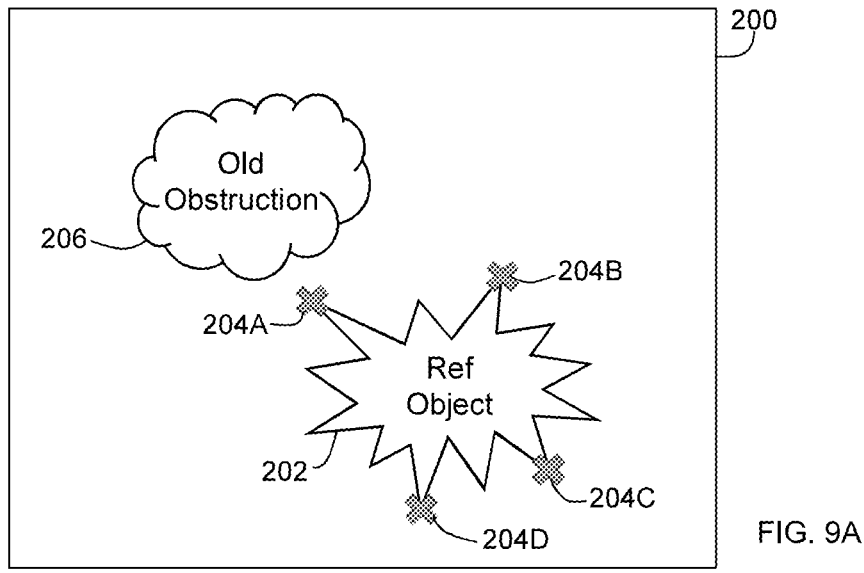
FIG. 9A is a schematic illustration of a reference image showing an object and an obstruction.

FIG. 9A is a schematic illustration of a reference scene 200 comprising a reference object 202 having a plurality of landmarks 204A, 204B, 204C, 204D, and a further object 206. The further object 206 may be referred to as an old obstruction. The old obstruction does not overlap any part of the reference object 202.

Figure 9B:
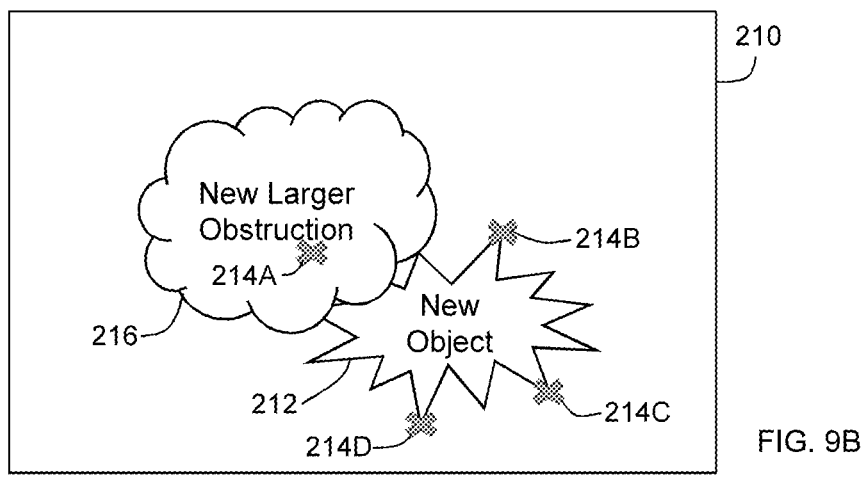
FIG. 9B is a schematic illustration of a novel image showing an object and a larger obstruction than the obstruction of FIG. 9A.

FIG. 9B is a schematic illustration of a novel scene 210 which has viewing obstructions. The novel scene 210 comprises a new object 212 having a plurality of landmarks 214A, 214B, 214C, 214D, and a further object 216. The further object 216 in the novel scene 210 is larger than the old obstruction 206, and may be referred to as a new, larger obstruction. The new, larger obstruction 216 partially overlaps the new object 212. The new, larger obstruction 216 obscured one of the landmarks 214A of the new object 212.

In an embodiment, the registration circuitry 28 includes visibility as part of the spring energy criteria used in a landmark-based registration of the reference scene 200 and the novel scene 210.

Figure 9C:
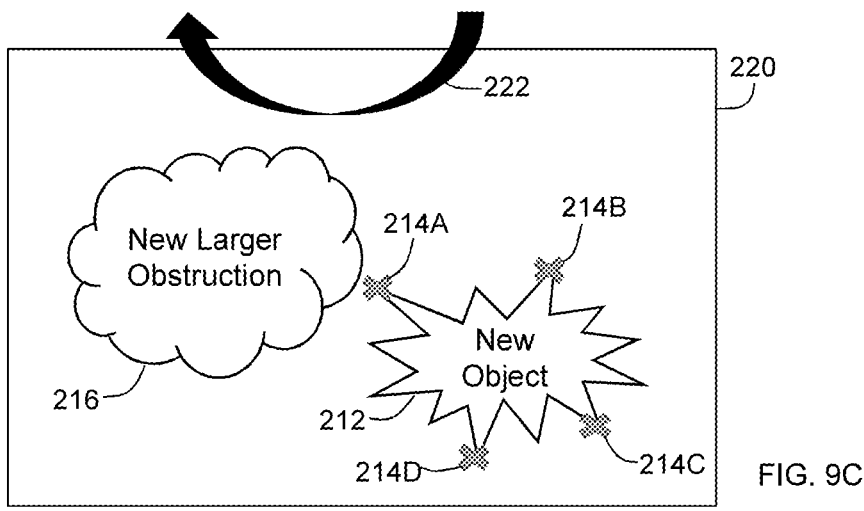
FIG. 9C is a schematic illustration of a novel image showing the object and larger obstruction of FIG. 9B from a rotated view.

The registration circuitry 28 obtains a further novel scene 220 by applying a slight rotation to the rendering parameters used to render the novel scene 210. The slight rotation is represented in FIG. 9C by arrow 222. By applying the slight rotation, the obstruction is cleared. The new, larger obstruction 216 no longer overlaps the new object 212 in the further novel scene.

A result of adding visibility to the spring energy criteria is an algorithm that will accept small variations on a precise stored reference scene in order to correctly show all of the relevant data, regardless of possible instructions.

In other embodiments, any suitable criteria may be added to the spring equation. Any suitable way of incorporating visibility into a registration or optimization may be used.

In some embodiments, workflow specific presets may be used, for example in cardiology. A workflow-specific preset may be a preset that is configured to display a specific pathology automatically in a 3D view.

In some circumstances, diagnosticians or others may collaborate on good presets for a given workflow. For example, experts in house may create a set of presets that they consider to be valuable for a specific application's workflow. A resulting product may include the presets without including the source data from which the presets are maintained.

In some embodiments, the computation of reference visibility, importance and weighting is performed on a first computing system, which creates and stores a preset. For example, the method of FIG. 2 may be performed on the first computing system. A second, different computing system is then used to read the preset and to solve the energy equation, for example using the method of FIG. 4. The second computing system may also correct stored transfer functions and compute visibility and importance for a novel landmark set, for example as described in relation to FIG. 8. The second computing system may belong to a user.

In some embodiments, a user may configure one or more presets by selecting an image to use as a reference image and/or by choosing a set of parameter values. A user may configure a default view to be used on images rendered for that user. A user may create and share a preset that is representative of a user's preferred default view.

Users may collaborate to create presets. The presets may then be stored, loaded and utilized by others without need for communication of reference data.

In some embodiments, a registration method as described above is used in an interventional application. A registration between a live acquisition and a previously acquired scan is performed. There is a live registration of the scan to the specific landmarks within the view of the interventional view.

In some embodiments, the registration circuitry 28 only includes in the registration landmarks that are in view.

In some embodiments, a system for storing the camera position, orientation, and frame extents relative to the detected landmarks present in the scene and the system for reading the camera position, orientation, and frame extents relative to the detected landmarks present in the scene are located on different physical machines, or in different applications.

Although the embodiments above are described with regard to medical imaging data, in other embodiments any data may be rendered using methods described above. For example, the data may comprise oil and gas data. The data may comprise three-dimensional microscopy data. The data may comprise, for example, climate data, geological surveys, demographics or games data.

Certain embodiments provide a method for weighting landmarks to be used in a registration mapping between scenes which contain different, heterogeneous, volumes which comprises:

a) A system for identifying salient volume features, landmarks.

b) A system for weighting those landmarks importance to the visible scene based on visibility, nearness to the center of the scene image, and other possible metrics, such as a pre-programmed workflow-specific feature importance.

c) A system for storing the camera position, orientation, and frame extents relative to the detected landmarks present in the scene.

d) A system for reading a stored camera position, orientation, and frame extent relative to a detected set of landmarks, which then finds the minimum energy fit between the detected landmarks of a new, novel volume, and the landmark relative camera image of the stored reference scene.

The systems for storing and reading may also store other scene features, such as clip-plane location or light position.

Certain embodiments provide a method for automatically deducing a per-scene preferred opacity window-level. The system for weighting may not consider the visibility of the landmarks in the first instance and may instead fit based only on other importance factors (for example, location and feature importance) and then may optimize the opacity transfer function to yield the highest possible similarity in landmark visibility when compared to the stored scene.

The stored reference and novel volume may be rendered simultaneously, but sourced from different modalities, for example CT as a reference, with live Ultrasound capture overlaid on top.

The system for storing the camera position, orientation, and frame extents relative to the detected landmarks present in the scene and the system for reading the camera position, orientation, and frame extents relative to the detected landmarks present in the scene may be located on different physical machines, or in different applications.

The visibility of a landmark may be considered both in the weighting for that landmark, and in the minimum energy configuration computation, as a fourth dimension in addition to the special dimensions.

Certain embodiments provide a method for selecting rendering-related parameters based on weighting and fitting of landmarks, to be used in a registration mapping between scenes which represent different volumes, the method comprising: identifying relevant landmarks in a reference scene representing a volume; weighting the important of the landmarks to the scene (for example, based on visibility, nearness to the center of the scene, and other possible metrics, such as a pre-programmed workflow-specific feature importance); storing a camera position, orientation, and/or frame extents (and/or other rendering-related parameters) relative to the identified landmarks present in the scene; identifying further relevant landmarks in a further scene and/or volume; reading the stored camera position, orientation, and/or frame extent (and/or other rendering-related parameters) and determining camera position, orientation, and/or frame extent (or other rendering parameters) for the new scene and/or volume based on a fit between the landmarks of the reference scene and the further landmarks of the further scene and/or volume.

The fit may comprise a minimum energy fit.

The other rendering-related parameters may comprise at least one of scene features, clip-plane location or light position.

The method may be for automatically deducing a per-scene preferred opacity window-level based on the fitting of the weighted landmarks.

The fit may not initially take account of visibility of the landmarks and may instead fit based only on other importance factors (for example, location and feature importance) and may subsequently optimize an opacity transfer function to yield the highest possible similarity in landmark visibility when compared to the reference scene.

The reference and further volumes may be obtained using different modalities (e.g. CT and ultrasound) and may be rendered simultaneously, for example as overlaid images.

Whilst particular circuitries have been described herein, in alternative embodiments functionality of one or more of these circuitries can be provided by a single processing resource or other component, or functionality provided by a single circuitry can be provided by two or more processing resources or other components in combination. Reference to a single circuitry encompasses multiple components providing the functionality of that circuitry, whether or not such components are remote from one another, and reference to multiple circuitries encompasses a single component providing the functionality of those circuitries.

Whilst certain embodiments have been described, these embodiments have been presented by way of example only, and are not intended to limit the scope of the invention. Indeed the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms and modifications as would fall within the scope of the invention.

The invention claimed is:

1. An image processing apparatus comprising processing circuitry configured to:
   obtain a respective identity and location for each of a first plurality of anatomical landmarks in a reference volume;
   obtain a respective weighting for each anatomical landmark of the first plurality of anatomical landmarks;
   obtain a respective identity and location for each of a second plurality of anatomical landmarks in a further volume; and
   determine a transform based on a fit between the first plurality of anatomical landmarks and the second plurality of anatomical landmarks, wherein the fit is determined in dependence on the weightings.

2. An image processing apparatus according to claim 1, wherein the transform comprises values for position and orientation of a virtual camera.

3. An image processing apparatus according to claim 1, wherein the processing circuitry is further configured to store a reference transform used to render a reference image from the reference volume;
   and wherein the determining of the transform is in dependence on the reference transform.

4. An image processing apparatus according to claim 1, wherein the processing circuitry is further configured to:
   receive the further volume; and
   use the determined transform to render a new image from the further volume.

5. An image processing apparatus in accordance with claim 1, wherein the fit comprises a minimum energy fit.

6. An image processing apparatus in accordance with claim 1, wherein the determining of the fit between the first plurality of anatomical landmarks and the second plurality of anatomical landmarks comprises performing a minimum-energy registration, the minimum-energy registration comprising minimizing a sum of energies for the first and second plurality of anatomical landmarks, wherein the energies are weighted using the weightings.

7. An image processing apparatus according to claim 1, wherein the obtaining of the weightings comprises determining, for each of the first plurality of anatomical landmarks, an importance of the anatomical landmark to a reference image rendered from the reference volume.

8. An image processing apparatus according to claim 7, wherein the importance of each anatomical landmark to the reference image is based on at least one of: a visibility of the anatomical landmark in the reference image, a nearness of the anatomical landmark to a center of the reference image, a size of a feature associated with the anatomical landmark in the reference image, a salience of the anatomical landmark in the reference image, a depth of the anatomical landmark relative to the reference image, an importance of the anatomical landmark to a workflow, an importance of the anatomical landmark to a diagnosis.

9. An image processing apparatus in accordance with claim 1, wherein the determining of the fit between the first plurality of anatomical landmarks and the second plurality of anatomical landmarks comprises modelling a relationship between each one of the first plurality of anatomical landmarks and each corresponding one of the second plurality of anatomical landmarks as a respective spring equation having a plurality of spatial dimensions, wherein the spring equations are weighted using the weightings.

10. An image processing apparatus according to claim 8, wherein the weighting of each anatomical landmark is dependent on a respective visibility of said anatomical landmark in the reference image; and the spring equations further comprise an additional dimension that is representative of visibility.

11. An image processing apparatus according to claim 1, wherein the processing circuitry is further configured to determine a frame extent based on the fit between the first plurality of anatomical landmarks and the second plurality of anatomical landmarks.

12. An image processing apparatus according to claim 1, wherein the processing circuitry is further configured to determine at least one light position parameter based on the fit between the first plurality of anatomical landmarks and the second plurality of anatomical landmarks.

13. An image processing apparatus according to claim 1, wherein the processing circuitry is further configured to determine, based on the fit between the first plurality of anatomical landmarks and the second plurality of anatomical landmarks, at least one of a transfer function, an opacity parameter, a window level, a window width.

14. An image processing apparatus according to claim 1, wherein the processing circuitry is further configured to determine a position of at least one scene feature relative to the first plurality of anatomical landmarks and to use the fit between the first plurality of anatomical landmarks and the second plurality of anatomical landmarks to position a corresponding scene feature relative to the second plurality of anatomical landmarks.

15. An image processing apparatus according to claim 14, wherein the at least one scene feature comprises at least one of: a region of interest, a clip plane, a box, a path.

16. An image processing apparatus according to claim 1, wherein:
the weightings are not based on visibility; and
the processing circuitry is further configured to obtain a respective visibility of each of the first plurality of anatomical landmarks, and to use the determined visibilities to determine an opacity transfer function.

17. An image processing apparatus according to claim 1, wherein the reference volume comprises a reference medical image data set and the further volume comprises a further medical image data set.

18. An image processing apparatus according to claim 1, wherein the reference volume comprises data obtained using a first imaging modality, and the further volume comprises data obtained using a second, different imaging modality.

19. An image processing apparatus according to claim 1, wherein the processing circuitry is further configured to:
use the transform to render a new image from the further volume; and
overlay the new image with the reference image.

20. A method comprising:
obtaining a respective identity and location for each of a first plurality of anatomical landmarks in a reference volume;
obtaining a respective weighting for each anatomical landmark of the first plurality of anatomical landmarks;
obtaining a respective identity and location for each of a second plurality of anatomical landmarks in a further volume; and
determining a transform based on a fit between the first plurality of anatomical landmarks and the second plurality of anatomical landmarks, wherein the fit is determined in dependence on the weightings.

* * * * *